(12) United States Patent
Shimizu et al.

(10) Patent No.: US 7,133,613 B2
(45) Date of Patent: Nov. 7, 2006

(54) ADDRESS DETERMINATION CIRCUIT AND OPTICAL COMMUNICATION SYSTEM

(75) Inventors: Hiroshi Shimizu, Tokyo (JP); Masayuki Suehiro, Tokyo (JP); Daisuke Hayashi, Tokyo (JP); Akira Miura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/282,563

(22) Filed: Nov. 21, 2005

(65) Prior Publication Data

US 2006/0133818 A1    Jun. 22, 2006

(30) Foreign Application Priority Data

Nov. 26, 2004  (JP) .......................... P.2004-341610

(51) Int. Cl.
*H04J 14/00* (2006.01)
(52) U.S. Cl. .............................. 398/46; 398/51; 398/53; 398/54
(58) Field of Classification Search ................. 398/46, 398/47, 51–54, 57, 166; 370/351, 389, 390, 370/392
See application file for complete search history.

(56) References Cited

U.S. PATENT DOCUMENTS 5,073,980 A * 12/1991 Prucnal et al. ................ 398/53

2004/0184713 A1 * 9/2004 Sato et al. ..................... 385/16

FOREIGN PATENT DOCUMENTS

JP    2003-69495 A    3/2003
JP    2004-120696 A   4/2004

* cited by examiner

*Primary Examiner*—Dalzid Singh
(74) *Attorney, Agent, or Firm*—Sughrue Mion, PLLC (57) ABSTRACT

An address determination circuit makes an address determination of an optical packet to which a destination address and a source address are assigned on a bit-by-bit basis. The address determination circuit has an optical branching section which divides the optical packet into branches, in which each of the branched optical packet contains the same original data, a delay section which delays at least one of the branched optical packets, a bit determination section which determines each bit value of the branched optical packets, and a logic operation section which performs a logic operation on the bit values of the branched optical packets determined by the bit determination section. The delay section delays the branched optical packets so that the logic operation section performs the logic operation on a bit assigned the destination address or the source address and a bit having a predetermined bit value in synchronization with each other.

8 Claims, 11 Drawing Sheets

ADDRESS DETERMINATION CIRCUIT AND OPTICAL COMMUNICATION SYSTEM

CROSS-REFERENCE TO RELATED APPLICATIONS

This application is based upon and claims the benefit of priority from the prior Japanese Patent Applications No. 2004-341610 filed on Nov. 26, 2004, the entire contents of which are incorporated herein by reference.

BACKGROUND OF THE INVENTION

1. Field of the Invention

This invention relates to an address determination circuit for making an address determination of an optical packet to which a destination address and a source address thereof are assigned on a bit-by-bit basis, and an optical communication system for transmitting the optical packet. The invention more particularly relates to an address determination circuit and an optical communication system capable of performing address processing of an optical packet at high speed while suppressing an increase in the circuit scale.

2. Description of the Related Art

In recent years, an optical communication system of conducting data communications using an optical signal has become widespread. In such an optical communication system, packet communications with using an optical signal are conducted as with data communications using an electric signal. The packet communications are communications of transmitting and receiving data divided into small pieces called packets, and it becomes very important to perform routing control of the packets.

Figure 11:
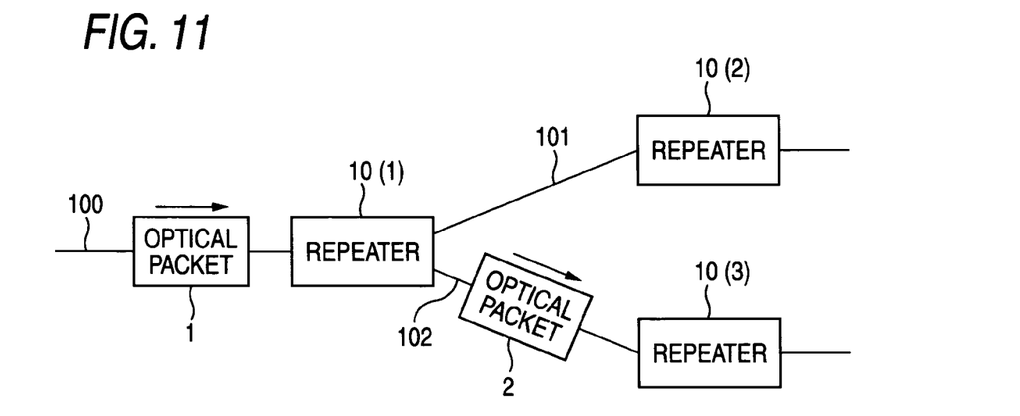
FIG. 11 is a drawing to show the configuration of an optical communication system in a related art.

FIG. 11 is a drawing to show the configuration of an optical communication system in a related art. (For example, refer to JP-A-2003-69495 and JP-A-2004-120696.) In FIG. 11, an optical packet 1 is transmitted over an optical transmission line 100 (for example, an optical waveguide of an optical fiber, etc.,) and is input to a repeater 10(1). The repeater 10(1) references the destination address and the source address contained in the header part of the optical packet 1, and selects a route for transmitting the optical packet 1. For example, the repeater 10(1) selects an optical transmission line 101 and outputs the optical packet 1 to a repeater 10(2) at the following stage or selects an optical transmission line 102 and outputs the optical packet 1 to a repeater 10(3) at the following stage. FIG. 11 illustrates an example wherein an optical packet 2 is transmitted to the repeater 10(3) over the optical transmission line 102. The repeaters 10(1) to 10(3) for performing destination control of the optical packets 1 and 2, namely, performing route switching are also called network switches.

Figure 12:
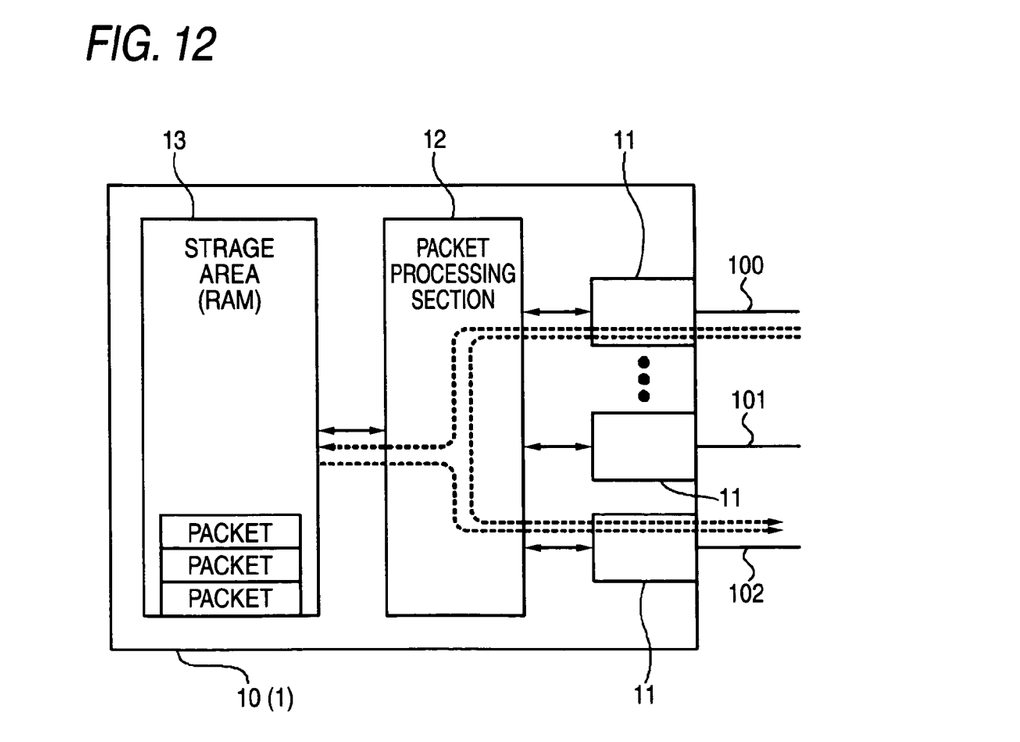
FIG. 12 is a drawing to show the configuration of a repeater in the related art for making an address determination.

Subsequently, the repeaters 10(1) to 10(3) will be discussed. FIG. 12 is a drawing to show the configuration of the repeater in the related art. (For example, refer to JP-A-2004-120696.) The repeater 10(1) in FIG. 11 to which the optical transmission lines 100 to 102 are connected will be discussed by way of example. In FIG. 12, a plurality of optical ports 11 are provided and the optical transmission lines 100 to 102 are connected thereto. A packet processing section 12 is interconnected to the optical ports 11. A storage area (for example, RAM) 13 is interconnected to the packet processing section 12.

The operation of the repeater 10(1) shown in FIG. 12 is as follows: The optical packet 1 is input from the optical transmission line 100 to the optical port 11. The optical port 11 converts the received optical packet 1 of an optical signal into a packet of an electric signal and outputs the packet of an electric signal to the packet processing section 12. The packet processing section 12 determines the optical port 11 to which the packet is to be transferred based on the destination address (and the source address as required) contained in the header part of the packet converted into the electric signal. The packet processing section 12 may once store the packet in the storage area 13 and then again read the packet and select the optical port 11 or may transfer the packet directly to the optical port 11 without storing the packet in the storage area 13. For example, the optical port 11 to which the optical transmission line 102 is connected is selected and the packet of the electric signal is output to the optical port 11. Further, the optical port 11 converts the packet of the electric signal into the optical packet 1 of an optical signal and outputs the optical packet 1 to the optical transmission line 102. Thus, the optical packets 1 and 2 are transferred to the optical transmission lines 100 to 102 selected by the repeater 10(1).

JP-A-2003-69495 and JP-A-2004-120696 (paragraph numbers 0008 to 0016, FIG. 8) are referred to as related art.

The transfer capability of the repeater 10(1), 10(2), 10(3) depends largely on the time taken for reading the destination address, etc., in the optical packet 1, 2 and determining the optical port 11 to which the packet is to be transferred, namely, the route selection of the optical transmission line 101, 102 from the destination address, etc.; particularly the processing speed of address processing of making address determination of the destination address and the source address is very important.

However, in the repeater 10(1), 10(2), 10(3) in the related art, since the packet processing section 12 and the storage area 13 perform packet processing by electric processing, it is indispensable to convert an optical signal into an electric signal and convert an electric signal into an optical signal in the optical port 11.

Generally, the speed of the electric processing is substantially low as compared with the transmission speed of optical communications. A delay occurs because the optical packet 1, 2 of the optical signal is converted into an electric signal and electric processing is performed as described above. Therefore, if the optical packet 1, 2 passes through the repeaters 10(1) to 10(3), a delay occurs in each of the repeaters 10(1) to 10(3) and the time involved in relaying is prolonged, causing a large delay to occur; this is a problem.

Of course, it is also possible to increase the electric processing speed so as to be able to follow the transmission speed of optical communications, but the circuitry and devices for performing the electric processing become remarkably large-scaled and it is very difficult to put them to use.

On the other hand, an attempt is made to execute address recognition with the optical packet 1, 2 of the optical signal intact without converting the optical signal into an electric signal. (For example, refer to JP-A-2003-69495.) However, there is a bottleneck such that the circuit scale becomes large, and it is difficult to make the attempt practical.

SUMMARY OF THE INVENTION

An object of the invention is to provide an address determination circuit and an optical communication system capable of performing address processing of an optical packet at high speed while suppressing an increase in the circuit scale.

The invention provides an address determination circuit for making an address determination of an optical packet to which a destination address and a source address thereof are assigned on a bit-by-bit basis, the address determination circuit having: an optical branching section which divides the optical packet into a plurality of branches, in which each of the branched optical packet contains the same original data; a delay section which delays at least one of the branched optical packets; a bit determination section which determines each bit value of the branched optical packets; and a logic operation section which performs a logic operation on the bit values of the branched optical packets determined by the bit determination section, wherein the delay section delays the branched optical packets so that the logic operation section performs the logic operation on a bit assigned the destination address or the source address and a bit having a predetermined bit value in synchronization with each other.

The address determination circuit further has a plurality of the optical branching sections, wherein the optical branching sections are provided at multiple stages, and the delay section is placed between the optical branching section at a preceding stage and the optical branching section at a following stage.

In the address determination circuit, the delay section has: a fixed delay section which is placed between the optical branching section at the preceding stage and the optical branching section at the following stage, and has a fixed delay amount; and a variable delay section which is placed between the optical branching section at the following stage and the bit determination section, and has a variable delay amount.

In the address determination circuit, the delay section is an optical fiber.

In the address determination circuit, the delay section delays the branched optical packets so that the bit assigned the destination address or the source address and a head bit of the optical packet are input to the logic operation section in synchronization with each other.

The invention also provides an optical communication system for transmitting an optical packet to which a destination address and a source address thereof are assigned on a bit-by-bit basis through a ring network, the optical communication system having: a repeater which is provided on the ring network, has the address determination circuit, and determines a destination of the optical packet according to an address determination result of the address determination circuit.

The optical communication system further has: a plurality of the repeaters; and a network which is connected to the repeater, and to which an address is assigned, wherein the address determination circuit of the repeater makes an address determination of an destination address of an optical packet from another repeater at a preceding stage, and if the destination address corresponds to an address assigned to a network connected to the repeater, the repeater transfers the optical packet from the another repeater at the preceding stage to the network connected to the repeater, whereas if the destination address does not correspond to the address assigned to the network connected to the repeater, the repeater transfers the optical packet from the another repeater at the preceding stage to a repeater at a following stage.

In the optical communication system, the address determination circuit of the repeater makes an address determination of an source address of the optical packet from the another repeater at a preceding stage, and if the source address corresponds to the address assigned to the network connected to the repeater, the repeater captures the optical packet from the another repeater at the preceding stage to transfer the optical packet to the network connected to the repeater or discards the optical packet, whereas if the source address does not correspond to the address assigned to the network connected to the repeater, the repeater transfers the optical packet from the another repeater at the processing stage to the repeater at the following stage.

According to the address determination circuit, the optical branching section divides an optical packet into a plurality of branches, in which each of the branched optical packet contains the same original data, and the delay section delays the branched optical packets. The different bits of the branched optical packets, namely, the bit having the predetermined value and the bit to make an address determination are input to the bit determination circuit at the same time. The logic operation section performs logic operation on the bits in synchronization with each other for making address determination. Accordingly, there is no necessity to make an address determination by electric processing. Further, there is no necessity to read all bits relevant to the destination address and the source address for performing address processing. Therefore, the address processing of an optical packet can be performed at high speed while an increase in the circuit scale is suppressed.

According to the address determination circuit, the delay section is placed between the optical branching section at the preceding stage and the optical branching section at the following stage, and delays the optical packets input to the bit determination circuits in batch. Accordingly, the delay section can be more miniaturized, and the cost can be more reduced than the case where the delay section is provided at the preceding stage of each bit determination circuit.

According to the optical communication system, the address determination circuit makes an address determination of the destination address and the source address on a bit-by-bit basis at high speed. The repeater having the address determination circuit determines the destination to which the optical packet is to be transferred according to the address determination result. Accordingly, if the optical packet passes through a plurality of repeaters, the delay in each of the repeaters can be suppressed. Therefore, the optical packet can be transferred at high speed.

According to the optical communication system, the repeater makes an address determination of the source address of the optical packet from the repeater at the preceding stage. If the source address corresponds to the address assigned to the network connected to the home repeater, the optical packet is captured. Accordingly, the unnecessary optical packet can be prevented from circulating through the ring network. Therefore, the optical packet can be transferred efficiently.

DETAILED DESCRIPTION OF THE PREFERRED EMBODIMENTS

Embodiments of the invention will be explained below with reference to the accompanying drawings.

[First Embodiment]

Figure 1:
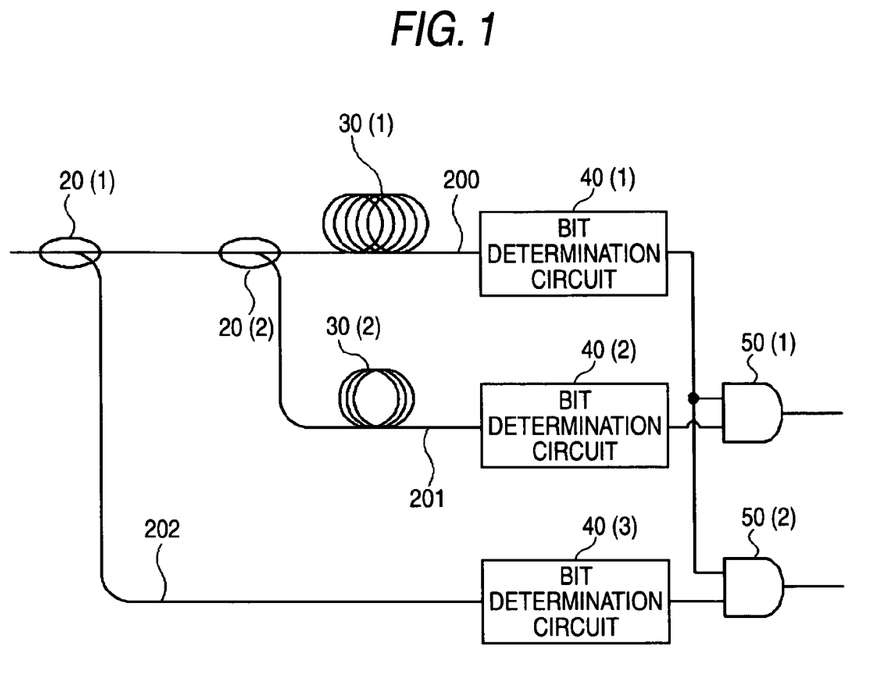
FIG. 1 is a configuration drawing to show a first embodiment of the invention.

FIG. 1 is a configuration drawing to show a first embodiment of the invention (address determination circuit). In FIG. 1, optical transmission lines 200 to 202 transmit an optical packet of an optical signal. The optical transmission lines 200 to 202 are, for example, optical waveguides of optical fibers, etc.

Optical couplers (The "optical coupler" can be named the "optical splitter".) 20(1) and 20(2) are provided on the optical transmission line 200, and divide an optical packet transmitted over the optical transmission line 200 into two branches, in which each of the branched optical packets contains the same original data. That is, the optical packet transmitted over the optical transmission line 200 is replicated into two optical packets. The optical coupler 20(2) is placed at the stage following the optical coupler 20(1) and divides one of the optical packets provided by the optical coupler 20(1) into two branches.

The optical transmission line 201 transmits the other optical packet provided by the optical coupler 20(2), and the optical transmission line 202 transmits the other optical packet provided by the optical coupler 20(1).

A delay optical fiber 30(1) is provided on the optical transmission line 200 for delaying one of the optical packets provided by the optical coupler 20(2) by a predetermined time Δt1. A delay optical fiber 30(2) is provided on the optical transmission line 201 for delaying the other optical packet provided by the optical coupler 20(2) by a predetermined time Δt2.

Bit determination circuits 40(1) to 40(3) are connected to the optical transmission lines 200 to 202 respectively for inputting optical packets. Each of the bit determination circuits 40(1) to 40(3) determines whether the value of each bit in the optical packet is "1" or "0." If the bit value is "1," for example, a high signal is output; if the bit value is "0," for example, a low signal is output.

An AND circuit 50(1) has one input connected to the output of the bit determination circuit 40(1) and the other input connected to the output of the bit determination circuit 40(2). The AND circuit 50(1) ANDs input signals to output the result of the AND operation. An AND circuit 50(2) has one input connected to the output of the bit determination circuit 40(1) and the other input connected to the output of the bit determination circuit 40(3). The AND circuit 50(2) ANDs input signals to output the result of the AND operation.

The bit determination circuits 40(1) to 40(3) may convert an optical signal into an electric signal using a light reception element, and the AND circuits 50(1) and 50(2) may perform electric logic operations. The light reception elements and the electric AND circuits 50(1) and 50(2) would be able to sufficiently follow the transmission speed of optical communications. The bit determination circuits 40(1) to 40(3) and the AND circuits 50(1) and 50(2) may make a bit determination and perform logic operations with optical signals intact using optical logic elements.

Figure 2:
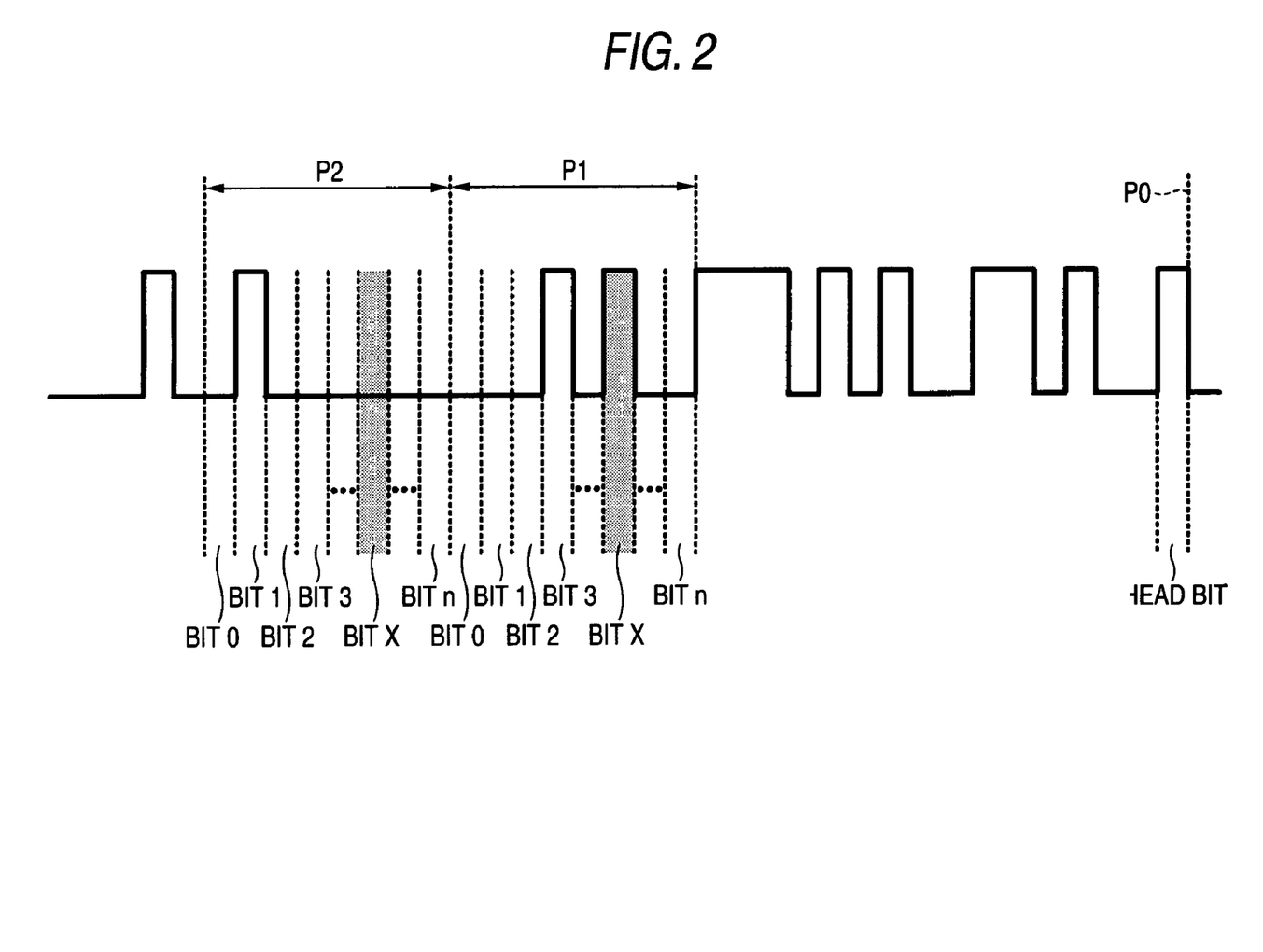
FIG. 2 is a drawing to show an example of a header part of an optical packet.

Subsequently, an optical packet will be discussed with FIG. 2. FIG. 2 is a drawing to show the header part of an optical packet in detail. In FIG. 2, a head part P0 is the front of the header of the optical packet, namely, the head of the optical packet, and the head bit of the head part P0 is set to a predetermined value "1." If there is no optical packet of an optical signal, "0" is set and therefore it is determined that an optical packet has been transmitted as the head bit is set to "1."

The header of the optical packet includes a destination address part P1 and a source address part P2 each at a position at a distance of a predetermined number of bits from the head part P0. Each of the address parts P1 and P2 has n bits, and destination addresses are assigned to the destination address part P1 on a bit-by-bit basis. Likewise, source addresses are assigned to the source address part P2 on a bit-by-bit basis. For example, bit 0 to bit n correspond to addresses A0 to An respectively. If the bit value is "1," an address is specified; if the bit value is "0," no address is specified.

Therefore, FIG. 2 illustrates an example wherein since bit 3 and bit x of the destination address part P1 are "1" and bit 1 of the source address part P2 is "1," a node, a network, or the like having address A1 is the source of the optical packet and a node, a network, or the like having address A3, Ax is the destination of the optical packet. The bit x corresponding to the address Ax is hatched in the figure.

The operation of the apparatus shown in FIG. 1 is as follows:

An optical packet input to the address determination circuit is transmitted over the optical transmission line 200 and is input to the optical coupler 20(1). The optical coupler 20(1) divides the input optical packet into two optical packets each containing the same original data and outputs one to the optical coupler 20(2) at the following stage and the other to the bit determination circuit 40(3) via the optical transmission line 202.

The optical coupler 20(2) divides the optical packet further into two optical packets each containing the same original data and outputs one to the optical transmission line 200 and the other to the optical transmission line 201. Further, one optical packet is delayed the predetermined time Δt1 by the delay optical fiber 30(1) and is input to the bit determination circuit 40(1). The other optical packet is delayed the predetermined time Δt2 by the delay optical fiber 30(2) and is input to the bit determination circuit 40(2). This means that the delay optical fibers 30(1) and 30(2) hold the optical packets for the times Δt1 and Δt2 respectively with the optical signals intact. (Delay time Δt1>Delay time Δt2)

Figure 3:
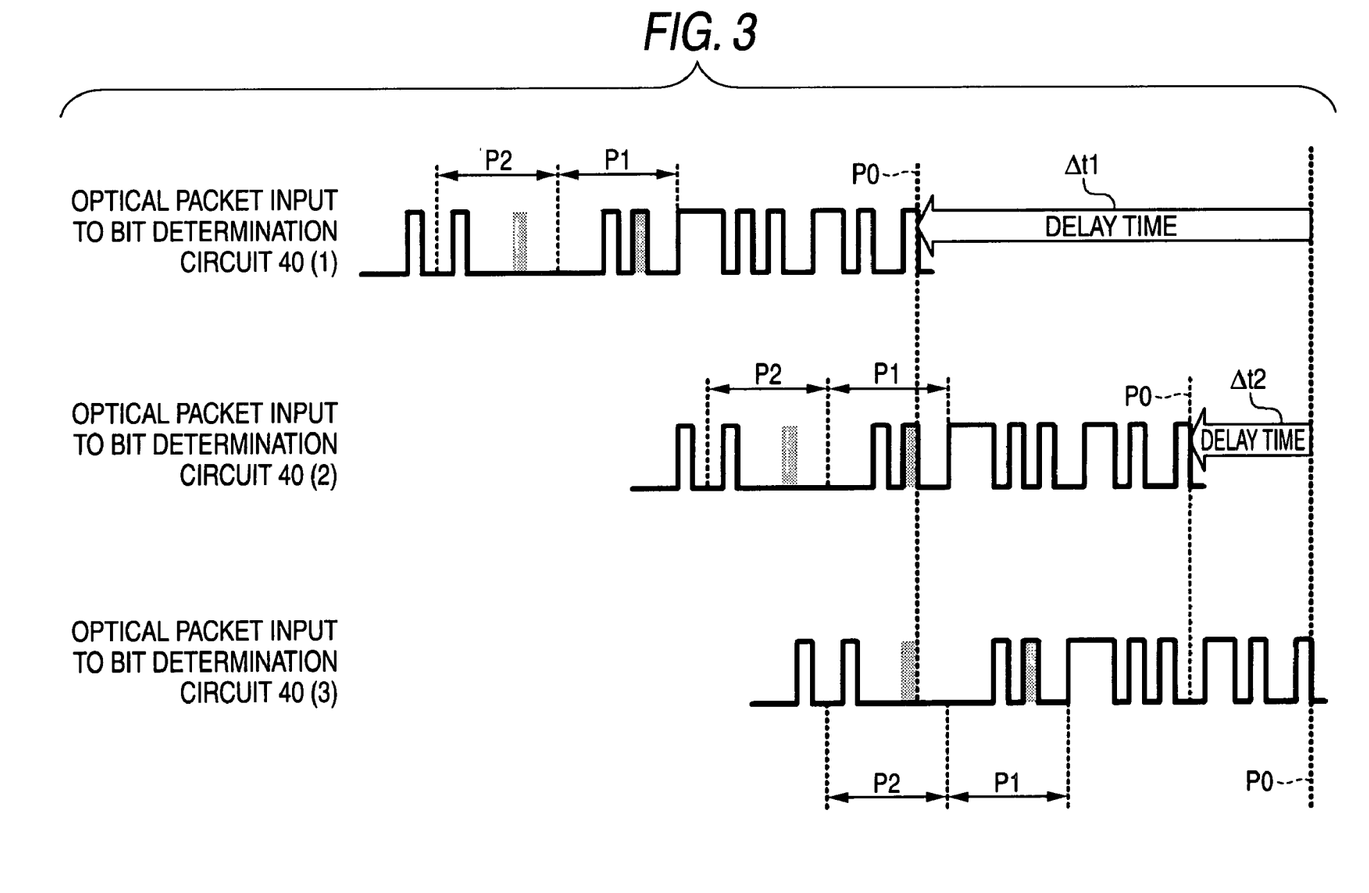
FIG. 3 is a drawing to show an example of the time relationship among provided optical packets in an address determination circuit shown in FIG. 1.

FIG. 3 is a drawing to show the time relationship among the optical packets input to the bit determination circuits 40(1) to 40(3). Parts identical with those previously described with reference to FIG. 2 are denoted by the same reference numerals in FIG. 3 and will not be discussed again. In FIG. 3, the upper stage indicates the optical packet input to the bit determination circuit 40(1), the intermediate stage indicates the optical packet input to the bit determination circuit 40(2), and the lower stage indicates the optical packet input to the bit determination circuit 40(3).

As shown in FIG. 3, the optical packet input to the bit determination circuit 40(1) is input thereto with a delay of the delay time Δt1 produced by the delay optical fiber 30(1) from the optical packet input to the bit determination circuit 40(3). The length of the delay optical fiber 30(1) is previously adjusted so that the delay time Δt1 is produced as the delay as much as the time from the head bit to the bit x of the source address part P2.

The optical packet input to the bit determination circuit 40(2) is input thereto with a delay of the delay time Δt2 produced by the delay optical fiber 30(2) from the optical packet input to the bit determination circuit 40(3). In other words, the optical packet input to the bit determination circuit 40(2) is earlier than the optical packet input to the bit determination circuit 40(1) by the time (Δt1−Δt2). For the time difference between the delay time Δt1 and the delay time Δt2 (Δt1−Δt2), the length of the delay optical fiber 30(2) is previously adjusted so that the time difference from the head bit to the bit x of the destination address part P1 is produced.

Therefore, at the same time, the head bit is input to the bit determination circuit 40(1), the bit x of the destination address part P1 is input to the bit determination circuit 40(2), and the bit x of the source address part P2 is input to the bit determination circuit 40(3). That is, the three desired bits in the optical packets (in FIG. 3, the head bit, the bit x of the destination address part P1, and the bit x of the source address part P2) are read into the bit determination circuits 40(1) to 40(3), namely, the three desired bits in the optical packets or in the one original optical packet are made parallel.

Each of the bit determination circuits 40(1) to 40(3) determines whether the bit value is "0" or "1." The bit determination circuit 40(1) outputs the determination result to the AND circuits 50(1) and 50(2), the bit determination circuit 40(2) outputs the determination result to the AND circuit 50(1), and the bit determination circuit 40(3) outputs the determination result to the AND circuit 50(2). Of course, the determination result is input to the AND circuits 50(1) and 50(2) almost at the same time.

Further, the AND circuit 50(1) ANDs the determination results of the bit determination circuits 40(1) and 40(2) and outputs the ANDing result as the address determination result. The AND circuit 50(2) ANDs the determination results of the bit determination circuits 40(1) and 40(3) and outputs the ANDing result as the address determination result. Specifically, the AND circuit 50(1) outputs a high signal indicating that the node, etc., of the address Ax corresponding to the bit x is specified as the destination. The AND circuit 50(2) outputs a low signal indicating that the node, etc., of the address Ax corresponding to the bit x is not the source. Further, a routing control section (not shown) at the following stage selects the route of optical transmission line to transfer the optical packet according to the results of the AND circuits 50(1) and 50(2).

To make an address determination of an address different from the address Ax, the fiber length of the delay optical fiber 30(1), 30(2) is changed. For example, to determine bit m corresponding to address Am (where 0≦m≦n) for both the destination and the source, the fiber length of only the delay optical fiber 30(1) is changed and at the same time, the head bit is input to the bit determination circuit 40(1), the bit m of the destination address part P1 is input to the bit determination circuit 40(2), and the bit m of the source address part P2 is input to the bit determination circuit 40(3).

Thus, the optical coupler 20(1) and 20(2) divide an optical packet into optical packets each containing the same original data and the delay optical fibers 30(1) and 30(2) delay the optical packets. The different bits of the provided optical packets, for example, the three bits of the head bit and the bit x of the destination and the bit x of the source to which address determination is to be applied are input to the bit determination circuits 40(1) to 40(3) at the same time and the AND circuits 50(1) and 50(2) AND the bits in synchronization with each other for making address determination. Accordingly, the need for making address determination entirely by performing electric processing as in the apparatus shown in FIG. 12 is eliminated and further the need for reading all bits of the destination address part P1 and the source address part P2 for performing address processing is eliminated. Therefore, the address processing of an optical packet can be performed at high speed while an increase in the circuit scale is suppressed.

[Second Embodiment]

Figure 4:
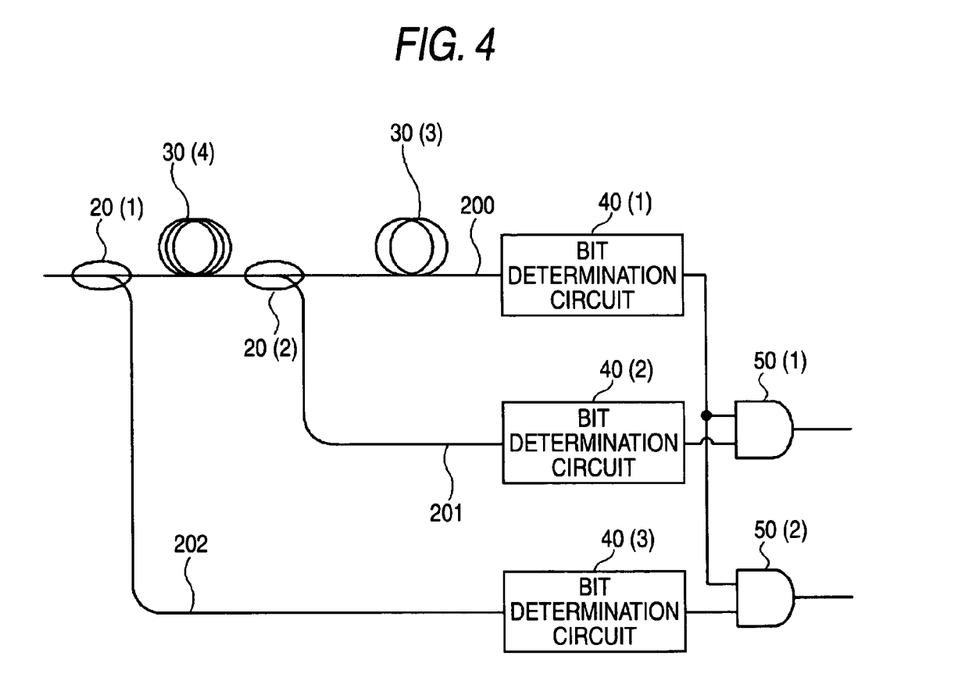
FIG. 4 is a configuration drawing to show a second embodiment of the invention.

FIG. 4 is a configuration drawing to show a second embodiment of the invention (address determination circuit). Parts identical with those previously described with reference to FIG. 1 are denoted by the same reference numerals in FIG. 4 and will not be discussed again. In FIG. 4, a delay optical fiber 30(3) with a variable delay amount is provided in place of the delay optical fiber 30(1). The delay optical fiber 30(2) is removed and a delay optical fiber 30(4) with a fixed delay amount is provided on an optical transmission line 200 between an optical coupler 20(1) at the preceding stage and an optical coupler 20(2) at the following stage.

The fiber length of the delay optical fiber 30(3) is previously adjusted to the length for delaying by time Δt3 from the head bit to bit x of a destination address part P1. The fiber length of the delay optical fiber 30(4) is previously adjusted to the length for delaying by time Δt4 between the bit x of the destination address part P1 and a bit x of a source address part P2, namely, as much as the n-bit time.

The operation of such an apparatus is as follows:

An optical packet input to the address determination circuit is transmitted over the optical transmission line 200 and is input to the optical coupler 20(1). The optical coupler 20(1) divides the input optical packet into two optical packets each containing the same original data and outputs one to the delay optical fiber 30(4) and the other to a bit determination circuit 40(3) via an optical transmission line 202.

One optical packet is delayed the predetermined time Δt4 by the delay optical fiber 30(4) and then the optical coupler 20(2) again divides the delayed optical packet into two optical packets each containing the same original data and outputs one to the optical transmission line 200 and the other to an optical transmission line 201. The one optical packet is further delayed the predetermined time Δt3 by the delay optical fiber 30(3) and is input to a bit determination circuit 40(1). The other optical packet is input to a bit determination circuit 40(2).

Figure 5:
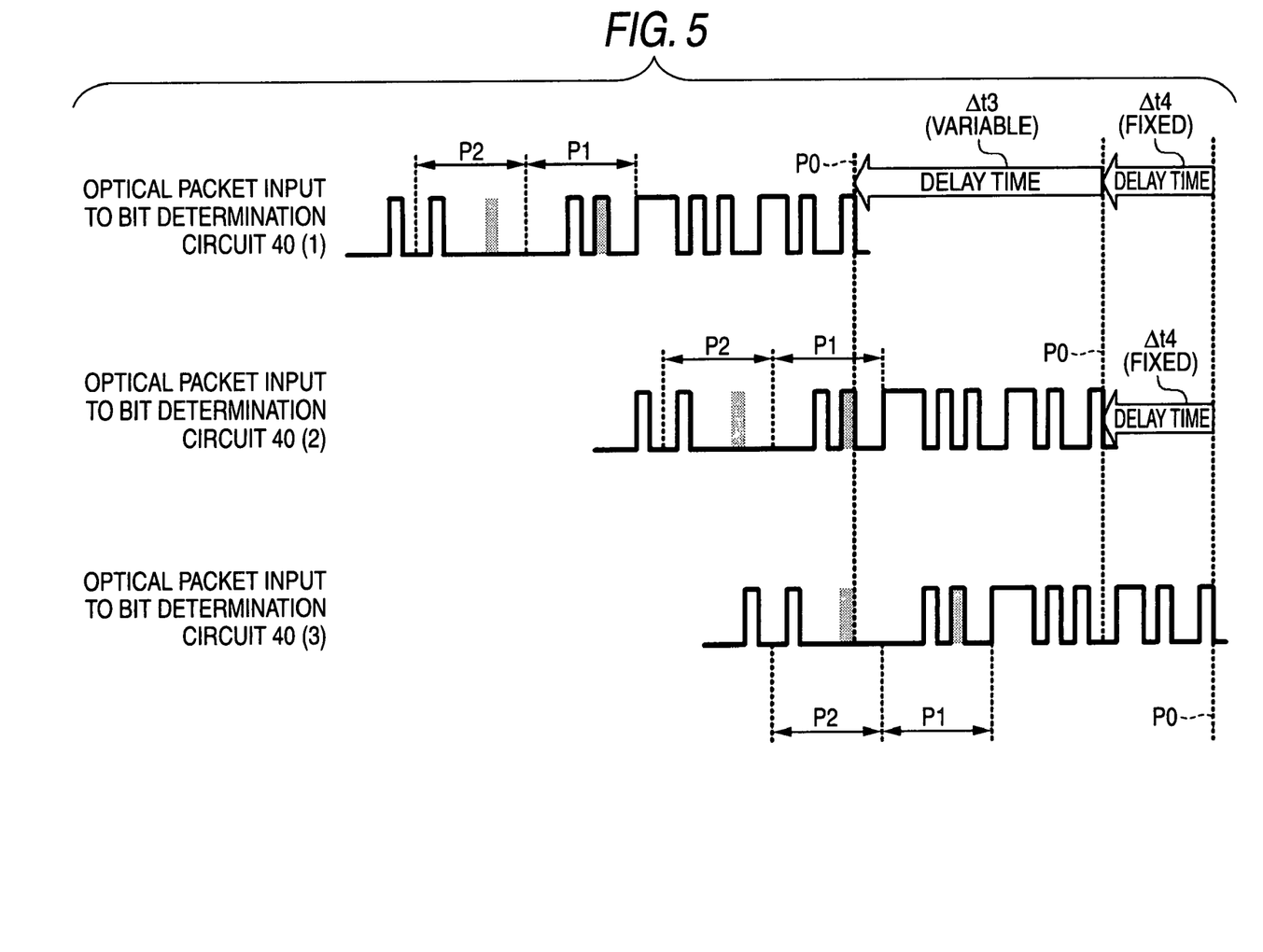
FIG. 5 is a drawing to show an example of the time relationship among provided optical packets in an address determination circuit shown in FIG. 4.

FIG. 5 is a drawing to show the time relationship among the optical packets input to the bit determination circuits 40(1) to 40(3). Parts identical with those previously described with reference to FIG. 3 are denoted by the same reference numerals in FIG. 5 and will not be discussed again. In FIG. 5, the upper stage indicates the optical packet input to the bit determination circuit 40(1), the intermediate stage indicates the optical packet input to the bit determination circuit 40(2), and the lower stage indicates the optical packet input to the bit determination circuit 40(3).

Therefore, at the same time, the head bit is input to the bit determination circuit 40(1), the bit x of the destination address part P1 is input to the bit determination circuit 40(2), and the bit x of the source address part P2 is input to the bit determination circuit 40(3) as with the apparatus shown in FIG. 1. That is, the three desired bits in the optical packets (in FIG. 5, the head bit, the bit x of the destination address part P1, and the bit x of the source address part P2) are read into the bit determination circuits 40(1) to 40(3), namely, the three desired bits in the optical packets or in the one original optical packet are made parallel. The operation of the bit determination circuits 40(1) to 40(3) each for determining the bit value and AND circuits 50(1) and 50(2) for ANDing the determination results is similar to that of the apparatus shown in FIG. 1 and therefore will not be discussed again.

To make an address determination of an address different from the address Ax, the fiber length of the delay optical fiber 30(3) is changed. For example, to determine bit m corresponding to address Am for both the destination and the source, the fiber length of only the delay optical fiber 30(3) is changed and at the same time, the head bit is input to the bit determination circuit 40(1), the bit m of the destination address part P1 is input to the bit determination circuit 40(2), and the bit m of the source address part P2 is input to the bit determination circuit 40(3).

Thus, the delay optical fiber 30(4) provided between the optical coupler 20(1) at the preceding stage and the optical coupler 20(2) at the following stage delays the optical packets input to the bit determination circuits 40(1) and 40(2) in batch, so that the fiber length of the delay optical fiber 30(3), 30(4) can be shortened as compared with the delay optical fiber 30(1), 30(2) used with the apparatus shown in FIG. 1. Accordingly, the circuitry can be miniaturized and the cost can be reduced.

[Third Embodiment]

Figure 6:
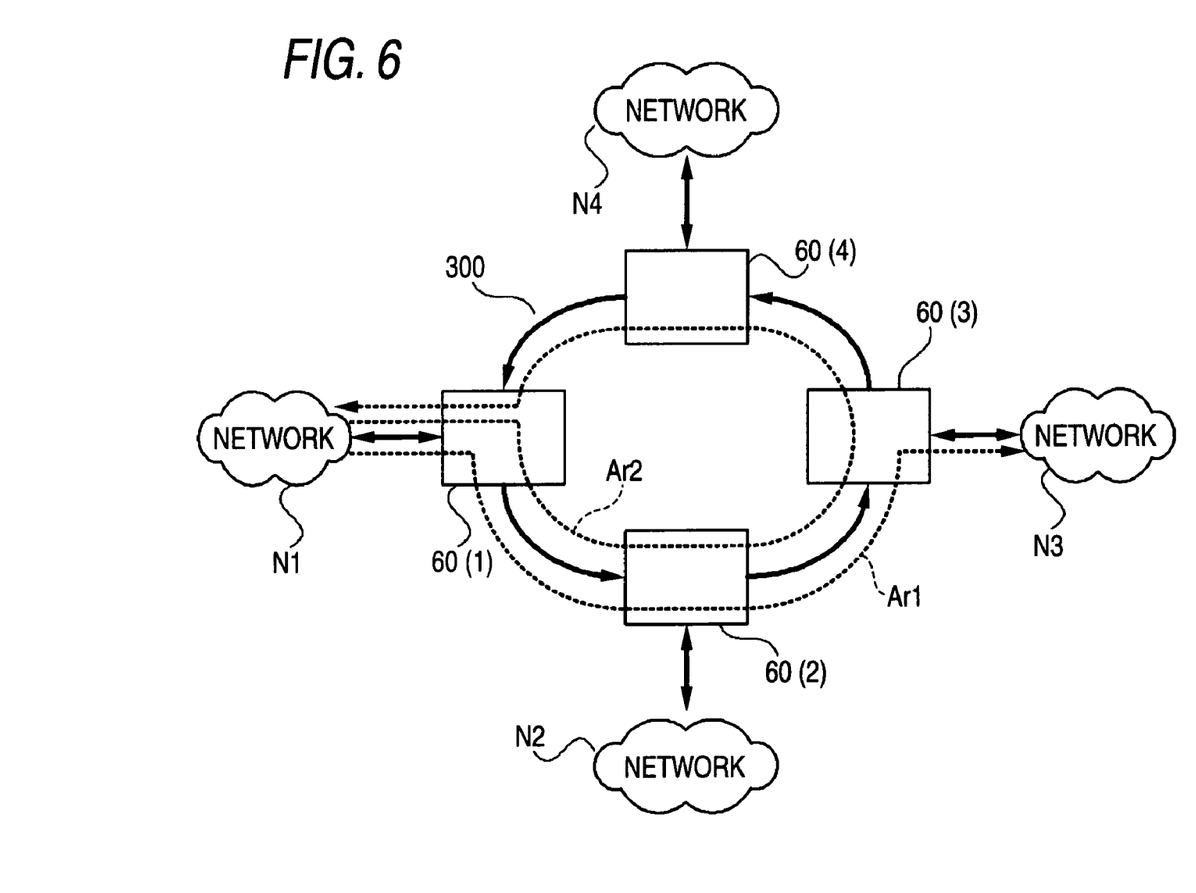
FIG. 6 is a configuration drawing to show a third embodiment of the invention using the address determination circuit shown in FIG. 1 or 4.

FIG. 6 is a configuration drawing to show a third embodiment of the invention using the address determination circuit shown in FIG. 1 or 4 (optical communication system). In FIG. 6, a plurality of repeaters 60(1) to 60(4) are provided on a ring network 300 and the address determination circuit shown in FIG. 1 or 4 (not shown in FIG. 6) is included. Each of the repeaters 60(1) to 60(4) makes an address determination of a destination address part P1 and a source address part P2 of an optical packet by the address determination circuit, determines the destination to which the optical packet is to be transferred according to the address determination result, and transfers the optical packet.

Networks N1 to N4 are connected to the repeaters 60(1) to 60(4) respectively and have their respective addresses. For example, address A1 is assigned to the network N1, address A2 is assigned to the network N2, address A3 is assigned to the network N3, and address A4 is assigned to the network N4. That is, to specify the address A1 of the network N1 in the optical packet shown in FIG. 2, for example, the value of bit 1 of the address part P1, P2 is set to "1."

Each of the repeaters 60(1) to 60(4) makes an address determination only for the network N1, N2, N3, N4 connected to the home repeater 60(1), 60(2), 60(3), 60(4) and transfers the optical packet to the home repeater 60(2), 60(3), 60(4), 60(1) at the following stage or the network N1, N2, N3, N4 according to the address determination result. For example, if the repeater is the repeater 60(2), it makes an address determination using bit 2 of the address part P1, P2 assigned the address A2 and transfers the optical packet to the repeater 60(3) or the network N2.

The operation of such an apparatus is as follows:

An example of transmitting an optical packet from a node (not shown) provided in the network N1 to the network N3 (see arrow Ar1 in FIG. 6) will be discussed. The node in the network N1 sets the destination of the optical packet to the network N3 of the address A3 and the source of the optical packet to the network N1 of the address A1 and outputs the optical packet to the repeater 60(1) connected to the network N1. The routing control section (not shown) of the repeater 60(1) outputs the optical packet to the repeater 60(2) at the following stage.

When the optical packet is input to the repeater 60(2), the address determination circuit (not shown) makes an address determination from the values of bits 2 of the destination address part P1 and the source address part P2 of the optical packet and the repeater 60(2) determines that neither the destination address nor the source address corresponds to the address, and the routing control section of the repeater 60(2) allows the optical packet to pass through.

Accordingly, the optical packet is input to the repeater 60(3) at the following stage and likewise the address determination circuit of the repeater 60(3) makes an address determination from the destination address and the source address, namely, the values of bits 3. The repeater 60(3) determines that the destination address corresponds to the address, and the routing control section of the repeater 60(3) captures the optical packet and transfers the optical packet to the network N3 connected to the repeater 60(3).

Subsequently, an example wherein a node provided in the network N1 sets the address of a non-existent network as the destination address (see arrow Ar2 in FIG. 6) will be discussed. The node in the network N1 sets the destination of an optical packet to an address not corresponding to any of the networks N1 to N4 and the source of the optical packet to the network N1 of the address A1 and outputs the optical packet to the repeater 60(1) connected to the network N1. The repeater 60(1) outputs the optical packet to the repeater 60(2) at the following stage.

When the optical packet is input to the repeater 60(2), the address determination circuit makes an address determination from the values of bits 2 of the destination address part P1 and the source address part P2 of the optical packet and the repeater 60(2) determines that neither the destination address nor the source address corresponds to the address, and allows the optical packet to pass through. Likewise, the address determination circuit of the repeater 60(3), 60(4) at the following stage makes an address determination from the destination address and the source address, namely, the values of bits 3, 4. The repeater 60(3), 60(4) determines that neither the destination address nor the source address corresponds to the address, and allows the optical packet to pass through.

The optical packet makes a round of the ring network 300 and is again input to the repeater 60(1) from the repeater 60(4) at the preceding stage, and the address determination circuit of the repeater 60(1) makes an address determination from the destination address and the source address, namely, the values of bits 1, and determines that the source address corresponds to the address. If the optical packet is again transferred to the repeater 60(2) at the following stage, the transferred optical packet will circulate through the ring network 300 permanently. Then, the repeater 60(1) captures the optical packet and returns the optical packet to the node in the network N1 connected to the repeater 60(1) or discards the optical packet.

Thus, each of the repeaters 60(1) to 60(4) determines whether or not the optical packet is addressed to the home repeater 60(1), 60(2), 60(3), 60(4) or whether or not the optical packet is transmitted by the home repeater 60(1), 60(2), 60(3), 60(4) to the ring network 300, and performs routing control. At this time, the address determination circuit shown in FIG. 1 or 4 makes an address determination of the destination address and the source address on a bit-by-bit basis, for example, one bit at a time at high speed. Each of the repeaters 60(1) to 60(4) determines the destination to which the optical packet is to be transferred according to the address determination result. Accordingly, if the optical packet passes through the repeaters 60(1) to 60(4), the delay in each of the repeaters 60(1) to 60(4) can be suppressed. Therefore, the optical packet can be transferred at high speed.

The repeater 60(1), 60(2), 60(3), 60(4) makes an address determination of the source address of the optical packet from the repeater 60(4), 60(1), 60(2), 60(3) at the preceding stage and if the source address corresponds to the address A1, A2, A3, A4 assigned to the network N1, N2, N3, N4 connected to the home repeater, the optical packet is captured. Accordingly, the unnecessary optical packet can be prevented from circulating through the ring network 300. Therefore, the optical packet can be transferred efficiently.

The invention is not limited to the specific embodiments and may be embodied as in (a) to (1) described below:

[Fourth Embodiment]

Figure 7:
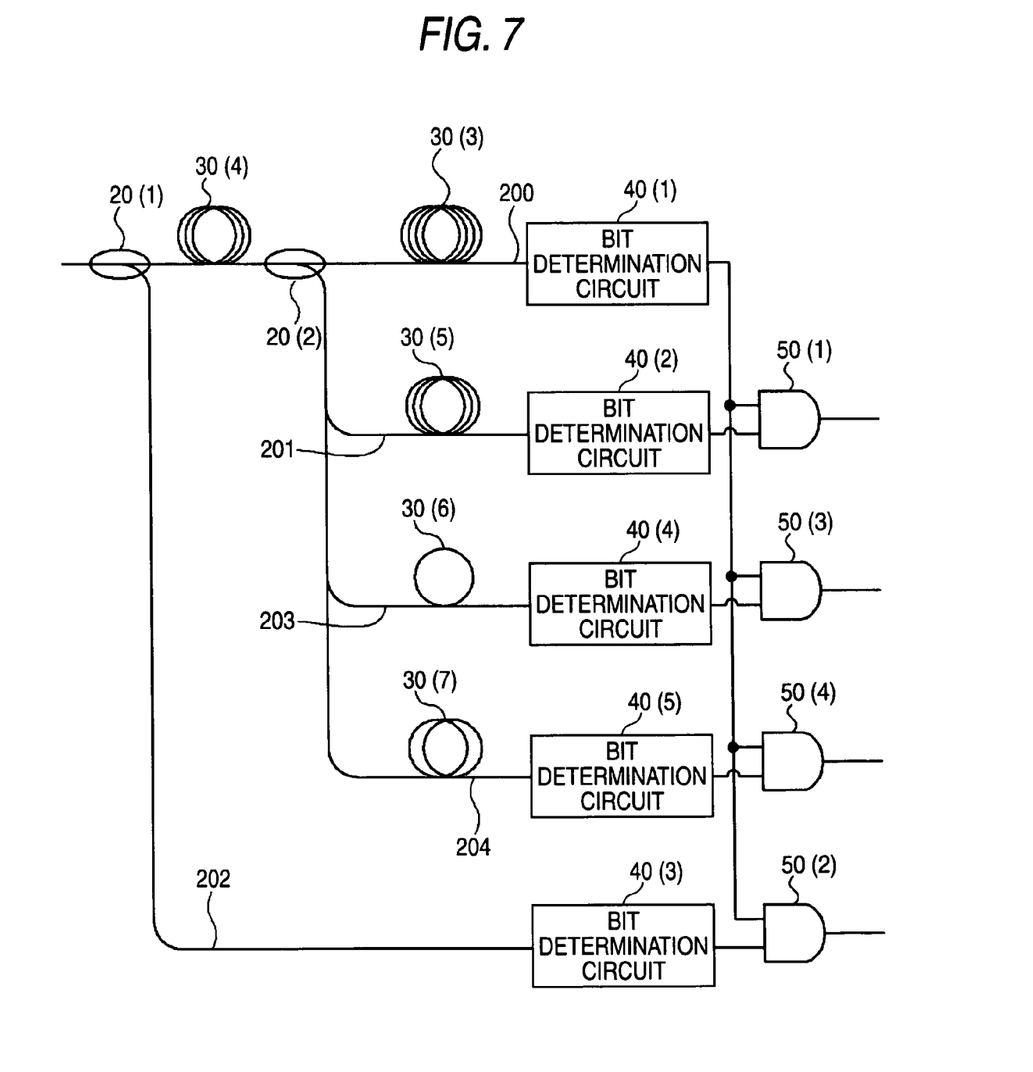
FIG. 7 is a configuration drawing to show a fourth embodiment of the invention.

(a) The address determination circuit shown in FIG. 1 or 4 makes an address determination of only one bit (for example, bit x) of the destination address part P1 and only one bit (for example, bit x) of the source address part P2, but may make an address determination of two or more bits. This configuration will be discussed with FIG. 7. Parts identical with those previously described with reference to FIG. 4 are denoted by the same reference numerals in FIG. 7 and will not be discussed again. In FIG. 7, an optical coupler 20(2) divides an optical packet into four optical packets each containing the same original data.

A first optical packet is input to a bit determination circuit 40(1) through an optical transmission line 200 and a delay optical fiber 30(3). A second optical packet is input to a bit determination circuit 40(2) through an optical transmission line 201 and a delay optical fiber 30(5). A third optical packet is input to a bit determination circuit 40(4) through an optical transmission line 203 and a delay optical fiber 30(6). Further, a fourth optical packet is input to a bit determination circuit 40(5) through an optical transmission line 204 and a delay optical fiber 30(7). The delay optical fibers 30(5) to 30(7) involve delay times $\Delta t5$ to $\Delta t7$ respectively and the times $\Delta t3$ and $\Delta t5$ to $\Delta t7$ differ from each other.

The determination results of the bit determination circuits 40(1) and 40(2) are input to an AND circuit 50(1). The determination results of the bit determination circuits 40(1) and 40(3) are input to an AND circuit 50(2). The determination results of the bit determination circuits 40(1) and 40(4) are input to an AND circuit 50(3). Further, the determination results of the bit determination circuits 40(1) and 40(5) are input to an AND circuit 50(4). That is, the determination result of the bit having a predetermined bit value (in FIG. 7, the head bit) may be input to one input of each of the AND circuits 50(1) to 50(4) and the determination result of the bit to make an address determination may be input to the other input.

Figure 8:
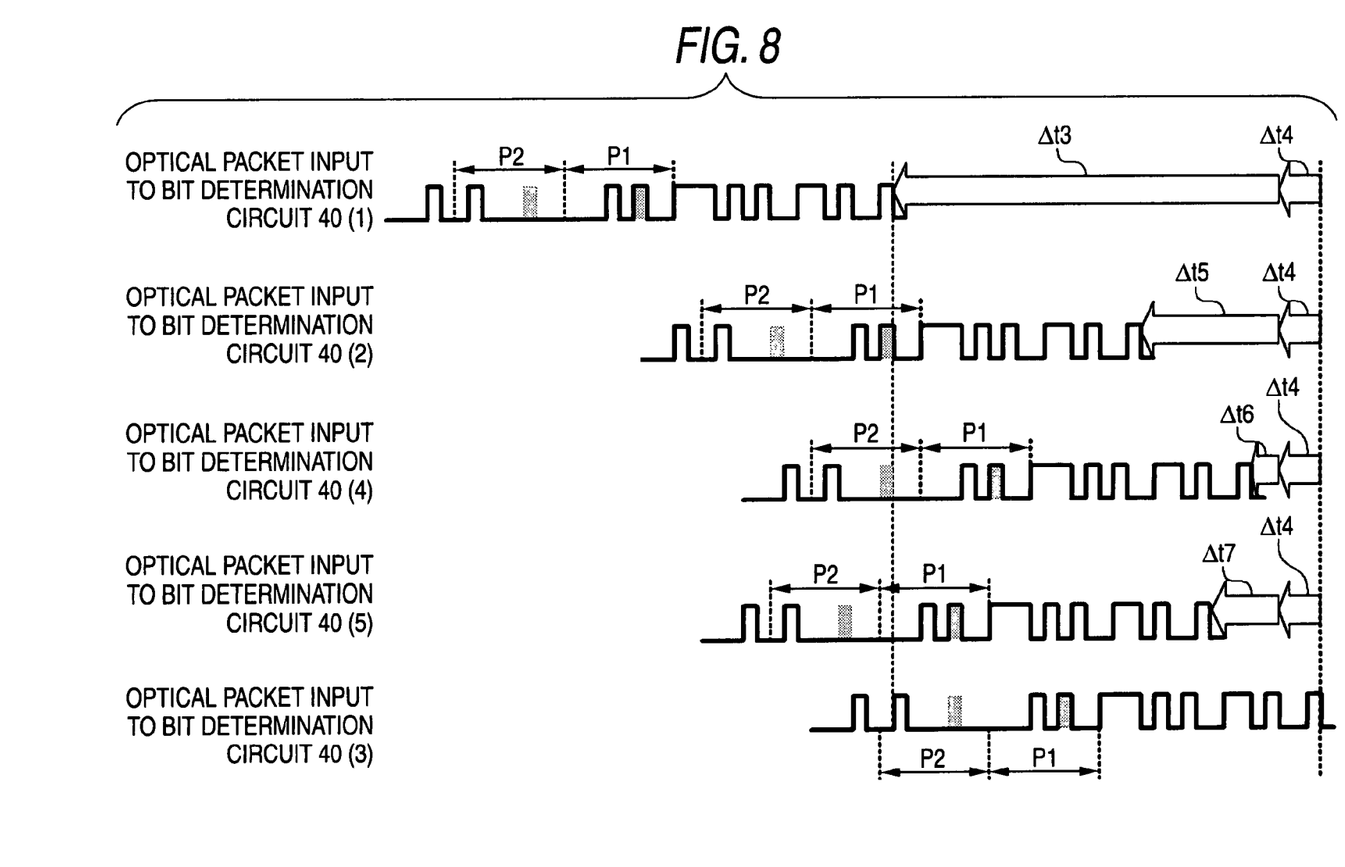
FIG. 8 is a drawing to show an example of the time relationship among provided optical packets in an address determination circuit shown in FIG. 7.

FIG. 8 is a drawing to show the time relationship among the optical packets input to the bit determination circuits 40(1) to 40(5). Parts identical with those previously described with reference to FIG. 5 are denoted by the same reference numerals in FIG. 8 and will not be discussed again. In FIG. 8, the head (first) stage indicates the optical packet input to the bit determination circuit 40(1), the second stage indicates the optical packet input to the bit determination circuit 40(2), the third stage indicates the optical packet input to the bit determination circuit 40(4), the fourth stage indicates the optical packet input to the bit determination circuit 40(5), and the bottom (fifth) stage indicates the optical packet input to the bit determination circuit 40(3).

As shown in FIG. 8, at the same time, the head bit is input to the bit determination circuit 40(1), the bit x of the destination address part P1 is input to the bit determination circuit 40(2), the bit x of the source address part P2 is input to the bit determination circuit 40(4), a bit y of the destination address part P1 ($x \neq y$, $0 \leq y \leq n$) is input to the bit determination circuit 40(5), and a bit y of the source address part P2 is input to the bit determination circuit 40(4).

Therefore, the AND circuits 50(1), 50(3), 50(4), and 50(2) make address determination of the bit x of the destination address part P1, the bit x of the source address part P2, the bit y of the destination address part P1, and the bit y of the source address part P2 respectively at the same time.

To change the bits x and y to make address determination in batch, the fiber length of the delay optical fiber 30(3) may be changed for adjusting the delay time $\Delta t3$.

[Fifth Embodiment]

(b) In the address determination circuit shown in FIGS. 1, 4, 7, the bit determination circuit 40(1) determines the bit value of any desired bit (for example, the head bit in FIGS. 1, 4, 7) and outputs the determination result to the AND circuits 50(1) to 50(4), but a bit determination circuit for determining the bit value of the head bit may be provided in parallel with each of bit determination circuits 40(2) and 40(3) for determining the bit value of the bit assigned an address. The bit determination circuit provided in parallel with the bit determination circuit 40(2) may be paired and the bit determination circuit provided in parallel with the bit determination circuit 40(3) may be paired and the determination results from the paired bit determination circuits may be input to AND circuits 50(1) and 50(2).

This configuration will be discussed with FIG. 9. Parts identical with those previously described with reference to FIG. 1 are denoted by the same reference numerals in FIG. 9 and will not be discussed again. An optical transmission line 205 and a bit determination circuit 40(6) are provided in parallel with an optical transmission line 202 and a bit determination circuit 40(3). This means that bit determination circuits 40(1) and 40(2) are paired and bit determination circuits 40(3) and 40(6) are paired. The determination results of the paired bit determination circuits 40(1) and 40(2) are input to the AND circuit 50(1), and the determination results of the paired bit determination circuits 40(3) and 40(6) are input to the AND circuit 50(2).

A delay optical fiber 30(8) is provided on the optical transmission line 205 for delaying one of the optical packets provided by an optical coupler 20(1) by a time $\Delta t8$ and outputting the delayed optical packet to the bit determination circuit 40(6). The delay time $\Delta t8$ of the delay optical fiber 30(8) is previously adjusted according to the fiber length so that the head bit is input to the bit determination circuit 40(6) at the same time as the head bit of the optical fiber input to the bit determination circuit 40(1).

Figure 9:
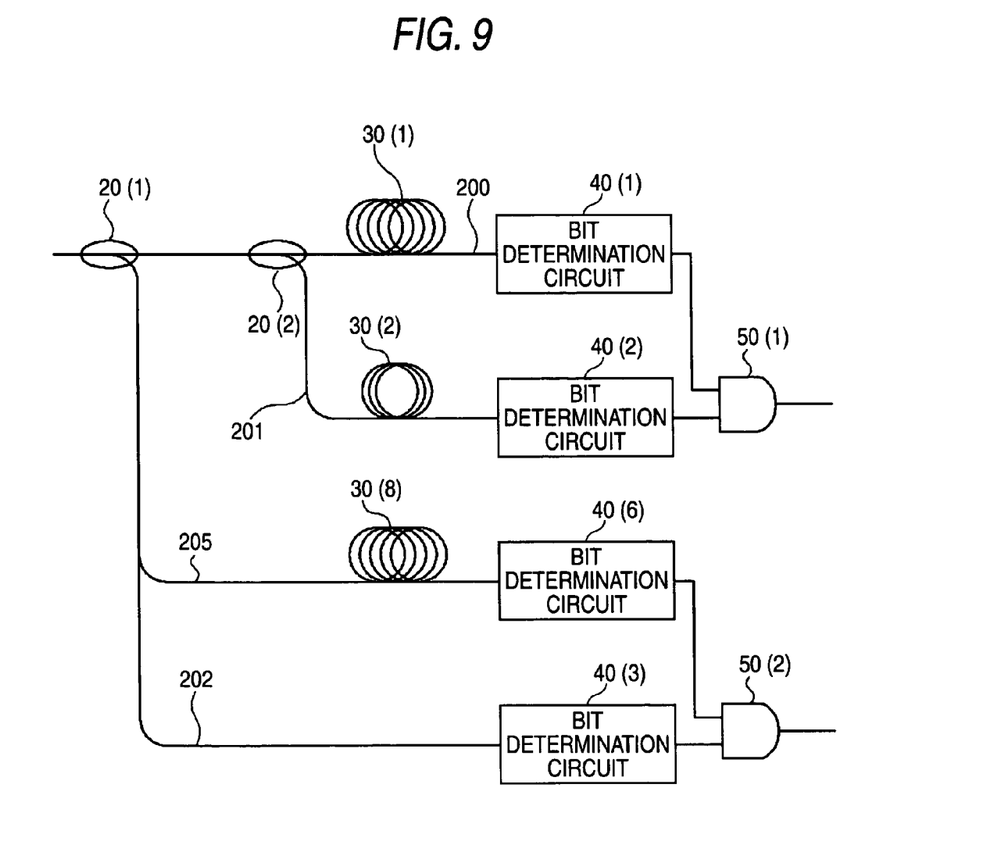
FIG. 9 is a configuration drawing to show a fifth embodiment of the invention.
Figure 10:
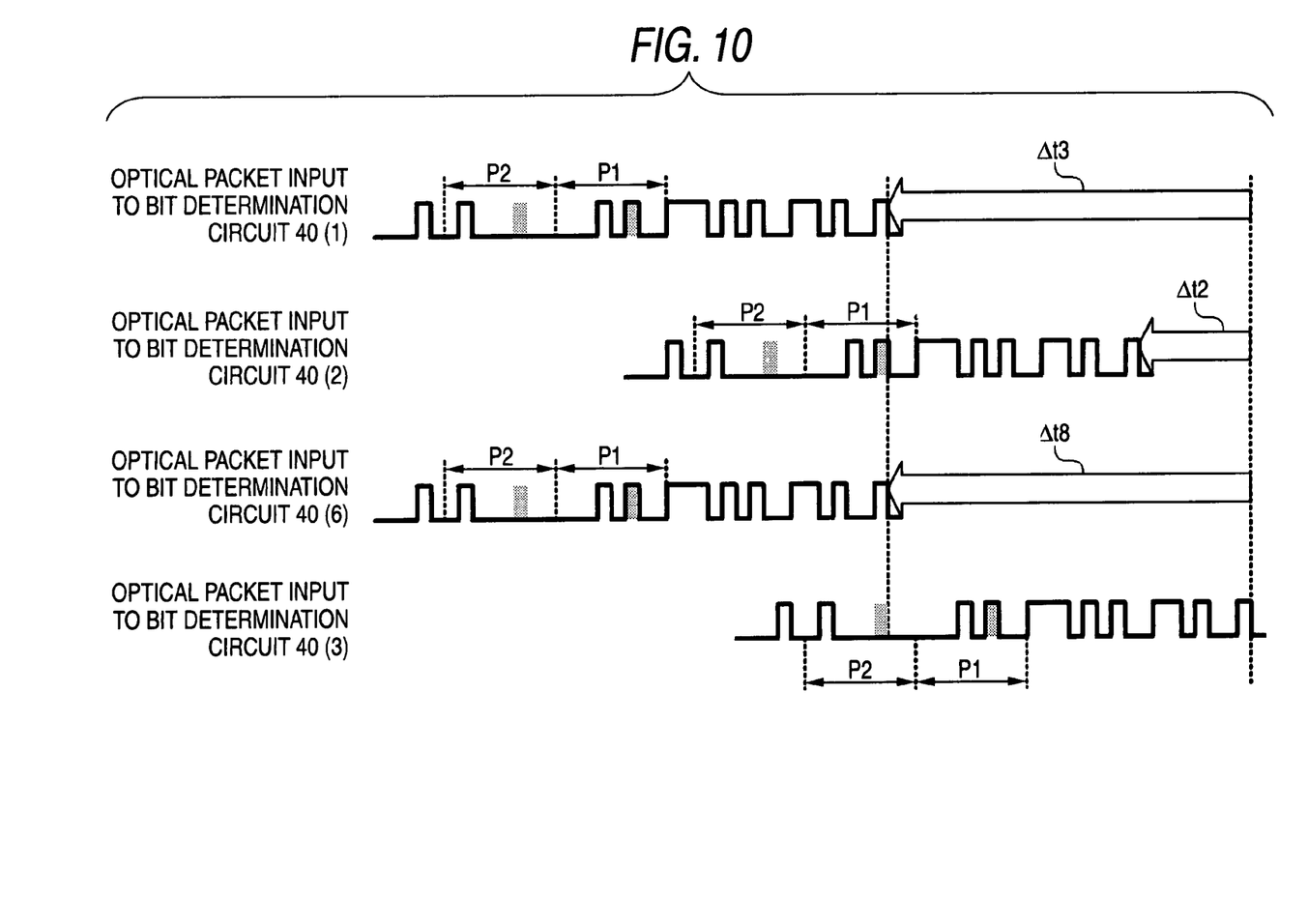
FIG. 10 is a drawing to show an example of the time relationship among provided optical packets in an address determination circuit shown in FIG. 9.

Subsequently, the operation of the address determination circuit shown in FIG. 9 is as follows: FIG. 10 is a drawing to show the time relationship among the optical packets input to the bit determination circuits 40(1) to 40(3) and 40(6). Parts identical with those previously described with reference to FIG. 3 are denoted by the same reference numerals in FIG. 9 and will not be discussed again. In FIG. 10, the head (first) stage indicates the optical packet input to the bit determination circuit 40(1), the second stage indicates the optical packet input to the bit determination circuit 40(2), the third stage indicates the optical packet input to the bit determination circuit 40(6), and the bottom (fourth) stage indicates the optical packet input to the bit determination circuit 40(3).

The optical coupler 20(1) divides an optical packet into three optical packets each containing the same original data and outputs first and second optical packets to an optical coupler 20(2) and the optical transmission line 202 respectively at the following stage as with the apparatus shown in FIG. 1. The optical coupler 20(1) outputs a third optical packet to the bit determination circuit 40(6) through the optical transmission line 205 and the delay optical fiber 30(8).

Therefore, as shown in FIG. 10, at the same time, the head bit is input to the bit determination circuit 40(1), a bit x of a destination address part P1 is input to the bit determination circuit 40(2), the head bit is input to the bit determination circuit 40(6), and a bit x of a source address part P2 is input to the bit determination circuit 40(3).

Further, the AND circuits 50(1) and 50(2) make address determination of the bit x of the destination address part P1 and the bit x of the source address part P2 at the same time.

To change the bits x to make address determination in batch, the fiber lengths of the delay optical fibers 30(1) and 30(8) may be changed for adjusting the delay-times Δt3 and Δt8.

(c) The address determination circuit shown in FIGS. 1, 4, 7, 9 makes address determination of both the destination and source addresses at the same time, but may make an address determination of only either of the destination and source addresses, for example, the destination address.

(d) The address determination circuit shown in FIGS. 1, 4, 7, 9 uses the head bit of an optical packet to perform logic operations on the head bit and the bit x representing the address Ax, but may perform logic operations using any desired bit having a predetermined bit value rather than the head bit.

(e) In the address determination circuit shown in FIGS. 1, 4, 7, 9, addresses A0 to An are assigned to bits 0 to n of the destination address part P1, the source address part P2. However, for example, addresses A0 to An-1 may be assigned to bits 0 to n-1 of the destination address part P1, the source address part P2 and a plurality of any desired addresses or all of the addresses A0 to An-1 may be assigned to bit n of the destination address part P1, the source address part P2. This configuration is useful for multicast, broadcast, etc., for example.

(f) In the address determination circuit shown in FIGS. 1, 4, 7, 9, the optical couplers are provided as one example of the optical dividing section 20, but the optical dividing section 20 may be any if it can divide an optical packet into optical packets each containing the same original data; for example, it may be a half mirror, a beam splitter, etc.

(g) In the address determination circuit shown in FIGS. 1, 4, 7, 9, the delay optical fibers 30(1) to 30(8) are used as one example of the delay section, but the delay section may be any if it allows the transmission line length of the optical transmission line for transmitting an optical packet to be adjusted. For example, an air gap may be provided between optical waveguides and the length may be adjusted between the air gaps.

(h) In the address determination circuit shown in FIGS. 1, 4, 7, 9, the AND circuits 50(1) to 50(4) are used as an example of the logic operation section for ANDing the determination results of the bit determination circuits 40(1) to 40(6). However, the logic operation section may perform logic operations using any logic circuits, such as OR, NOR, XOR, or NAND or a combination thereof, and may perform bit masking, etc.

(i) In the address determination circuit shown in FIGS. 1, 4, 7, 9, the delay optical fibers 30(1) to 30(8) delay a plurality of optical packets of the provided optical packets, but at least one of the optical packets provided by the optical coupler 20(1), 20(2) may be delayed. Of course, all provided optical packets may be delayed.

(j) In the circuit or the system shown in FIGS. 1, 4, 6, 7, 9, one to n destination addresses of an optical packet may be specified and only one source address is specified, of course.

(k) In the address determination circuit shown in FIGS. 4, 7, the fiber length of the delay optical fiber 30(4) is fixed, but may be made variable.

(l) In the apparatus shown in FIG. 6, if the destination address corresponds to the address, the repeater 60(1), 60(2), 60(3), 60(4) captures the optical packet and transfers the optical packet only to the network N1, N2, N3, N4 connected to the home repeater 60(1), 60(2), 60(3), 60(4), but may transfer the optical packet to both the network N1, N2, N3, N4 connected to the home repeater 60(1), 60(2), 60(3), 60(4) and the repeater 60(2), 60(3), 60(4), 60(1) at the following stage without capturing the optical packet. If the source address of the optical packet from the repeater 60(4), 60(1), 60(2), 60(3) at the preceding stage corresponds to the address, the optical packet may be captured. Accordingly, the optical packet of the same data can be prevented from circulating through the ring network 300. Therefore, the optical packet can be transferred efficiently.

What is claimed is:

1. An address determination circuit for making an address determination of an optical packet to which a destination address and a source address thereof are assigned on a bit-by-bit basis, the address determination circuit comprising:

an optical branching section which divides the optical packet into a plurality of branches, in which each of the branched optical packet contains the same original data;

a delay section which delays at least one of the branched optical packets;

a bit determination section which determines each bit value of the branched optical packets; and a logic operation section which performs a logic operation on the bit values of the branched optical packets determined by the bit determination section, wherein the delay section delays the branched optical packets so that the logic operation section performs the logic operation on a bit assigned the destination address or the source address and a bit having a predetermined bit value in synchronization with each other.

2. The address determination circuit according to claim 1, further comprising:
a plurality of the optical branching sections,
wherein the optical branching sections are provided at multiple stages, and
the delay section is placed between the optical branching section at a preceding stage and the optical branching section at a following stage.

3. The address determination circuit according to claim 2, wherein the delay section has:
a fixed delay section which is placed between the optical branching section at the preceding stage and the optical branching section at the following stage, and has a fixed delay amount; and
a variable delay section which is placed between the optical branching section at the following stage and the bit determination section, and has a variable delay amount.

4. The address determination circuit according to claim 1, wherein the delay section is an optical fiber.

5. The address determination circuit according to claim 1, wherein the delay section delays the branched optical packets so that the bit assigned the destination address or the source address and a head bit of the optical packet are input to the logic operation section in synchronization with each other.

6. An optical communication system for transmitting an optical packet to which a destination address and a source address thereof are assigned on a bit-by-bit basis through a ring network, the optical communication system comprising:
a repeater which is provided on the ring network, comprises an address determination circuit according to claim 1, and determines a destination of the optical packet according to an address determination result of the address determination circuit.

7. The optical communication system according to claim 6, further comprises:
a plurality of the repeaters; and
a network which is connected to the repeater, and to which an address is assigned,
wherein the address determination circuit of the repeater makes an address determination of an destination address of an optical packet from another repeater at a preceding stage, and
if the destination address corresponds to an address assigned to a network connected to the repeater, the repeater transfers the optical packet from the another repeater at the preceding stage to the network connected to the repeater, whereas if the destination address does not correspond to the address assigned to the network connected to the repeater, the repeater transfers the optical packet from the another repeater at the preceding stage to a repeater at a following stage.

8. The optical communication system according to claim 7,
wherein the address determination circuit of the repeater makes an address determination of an source address of the optical packet from the another repeater at a preceding stage, and
if the source address corresponds to the address assigned to the network connected to the repeater, the repeater captures the optical packet from the another repeater at the preceding stage to transfer the optical packet to the network connected to the repeater or discards the optical packet, whereas if the source address does not correspond to the address assigned to the network connected to the repeater, the repeater transfers the optical packet from the another repeater at the processing stage to the repeater at the following stage.

* * * * *